US009523887B2

(12) United States Patent
Lee et al.

(10) Patent No.: US 9,523,887 B2
(45) Date of Patent: Dec. 20, 2016

(54) DISPLAY DEVICE

(71) Applicant: HON HAI PRECISION INDUSTRY CO., LTD., New Taipei (TW)

(72) Inventors: Cheng-Wei Lee, New Taipei (TW); Hsu-Pin Kao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 102 days.

(21) Appl. No.: 14/472,703

(22) Filed: Aug. 29, 2014

(65) Prior Publication Data

US 2015/0062481 A1    Mar. 5, 2015

(30) Foreign Application Priority Data

Aug. 30, 2013   (TW) .............................. 102131206 A

(51) Int. Cl.
| | | |
|---|---|---|
| *G02F 1/133* | (2006.01) | |
| *G02F 1/1335* | (2006.01) | |
| *G02F 1/1333* | (2006.01) | |

(52) U.S. Cl.
CPC ... *G02F 1/133608* (2013.01); *G02F 1/133603* (2013.01); *G02F 2001/133314* (2013.01); *G02F 2001/133628* (2013.01)

(58) Field of Classification Search
CPC ................................................ G02F 1/133615
See application file for complete search history.

(56) References Cited

U.S. PATENT DOCUMENTS

| | | | | |
|---|---|---|---|---|
| 7,545,461 B2* | 6/2009 | Kondo | ................. | G02B 6/0085 349/58 |
| 8,358,387 B2* | 1/2013 | Choi | ..................... | G02B 6/009 349/150 |
| 2006/0285362 A1* | 12/2006 | Cho | ..................... | G02B 6/0068 362/633 |
| 2008/0024694 A1* | 1/2008 | Kondo | ................. | G02B 6/0085 349/58 |
| 2009/0135583 A1 | 5/2009 | Hillman et al. | | |
| 2009/0147173 A1* | 6/2009 | An | ..................... | G02F 1/133603 349/58 |
| 2010/0128195 A1* | 5/2010 | Li | ..................... | G02F 1/133603 349/58 |
| 2010/0188607 A1* | 7/2010 | Park | ..................... | G02B 6/0073 349/62 |

FOREIGN PATENT DOCUMENTS

| | | |
|---|---|---|
| JP | 2008198398 A | 8/2008 |
| TW | 200617516 A | 6/2006 |

* cited by examiner

*Primary Examiner* — Phu Vu
(74) *Attorney, Agent, or Firm* — Zhigang Ma

(57) ABSTRACT

A display device includes a housing, a backlight module and a heat dissipation assembly. A first hole is defined in the housing. A hook formed on the housing. The backlight module includes a light bar. The heat dissipation assembly includes a main body and a heat dissipation column. The main body is fixed on the housing via the hook. The heat dissipation column is formed on the main body and exposed through the first hole. The heat dissipation assembly configured to absorb heat generated by the backlight module and dissipate the heat external to the housing.

9 Claims, 5 Drawing Sheets

DISPLAY DEVICE

FIELD

The disclosure generally relates to display technologies, and more particularly to a display device.

BACKGROUND

A liquid crystal display device usually includes a housing, a display panel and a backlight module received in the housing. However, the backlight module generates heat while the display device works, and the heat may deform the housing and the backlight module. Thus, a uniformity of the light emitted from the backlight module is adversely affected.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
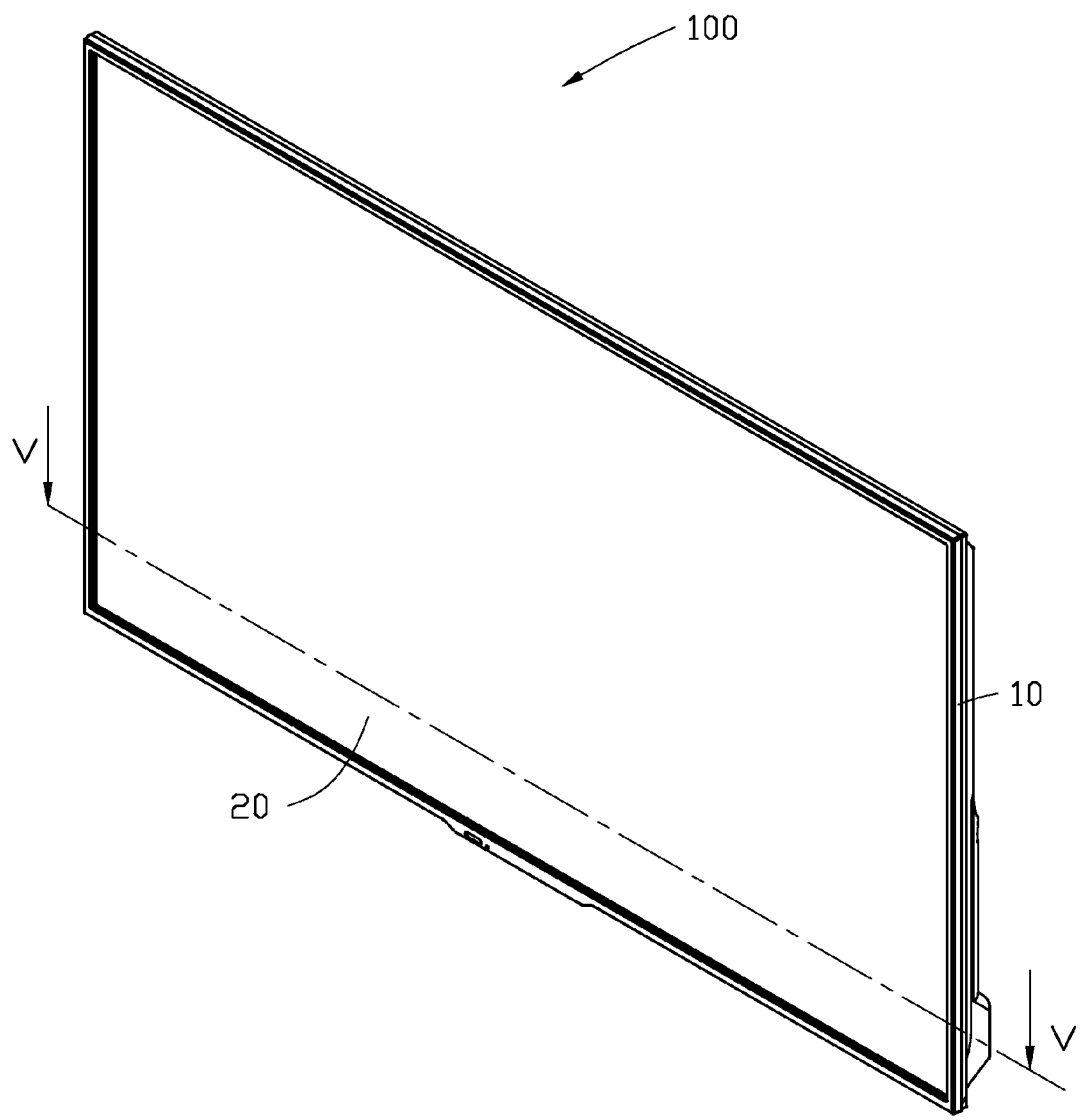
FIG. 1 is an isometric view of an embodiment of a display device.
Figure 2:
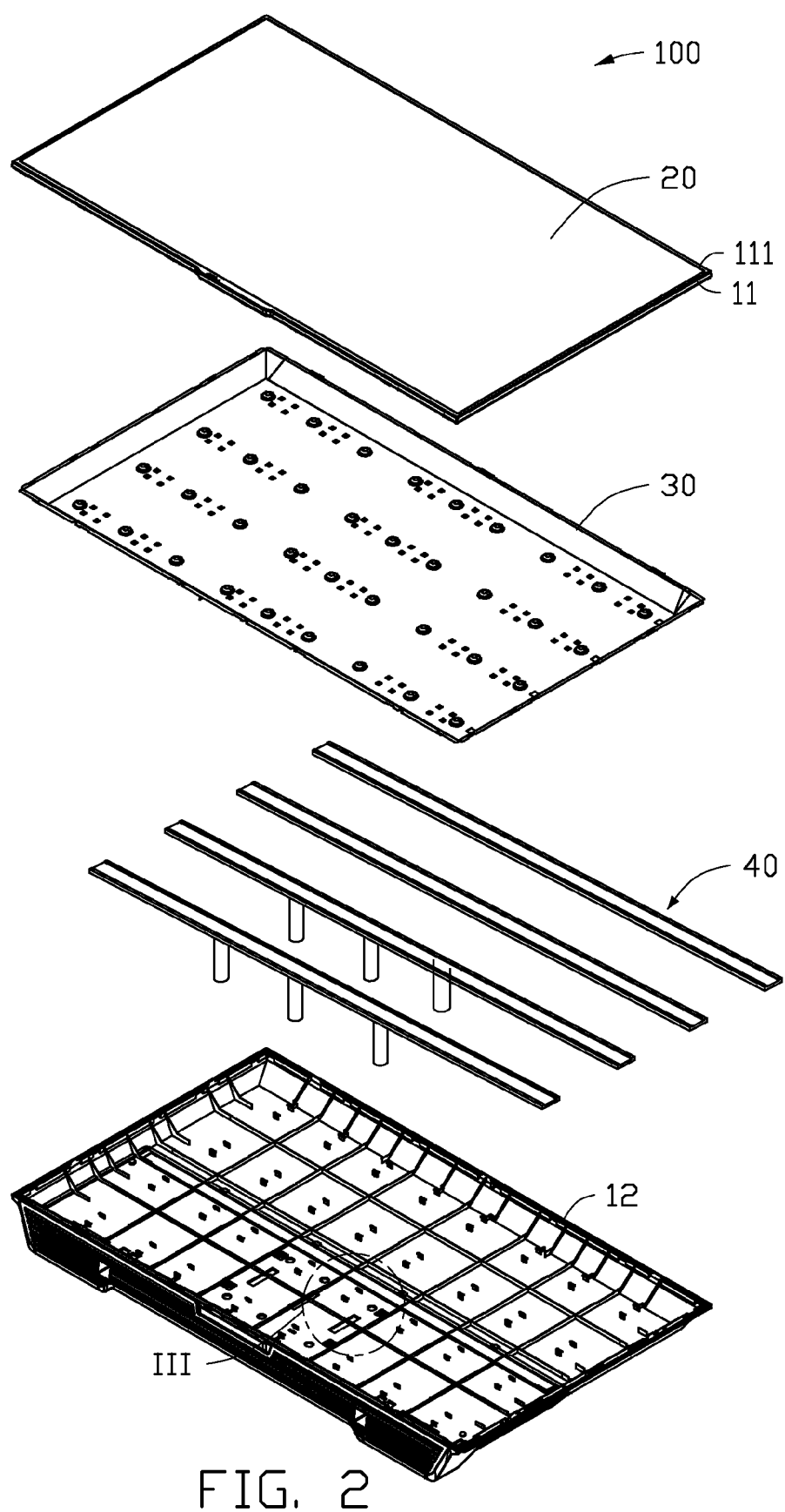
FIG. 2 is an exploded, isometric view of the display device of FIG. 1.

FIG. 1 is an isometric view of an embodiment of a display device. FIG. 2 is an exploded, isometric view of the display device of FIG. 1. Referring to FIGS. 1-2, the display device 100 includes a housing 10, a display panel 20, a backlight module 30, and a heat dissipation assembly 40. The display panel 20, backlight module 30, and heat dissipation assembly 40 are received in the housing 10. In this embodiment, the display panel 20 is liquid crystal display panel, and the display device 100 is a liquid crystal display device.

The housing includes a front frame 11 and a back frame 12. The heat dissipation assembly 40 is assembled between the backlight module 30 and the back frame 12. The heat dissipation assembly 40 is configured to absorb heat generated by the backlight module 30 and dissipate the heat external to the housing 10. The front frame 11 defines an open area 111. The display panel 20 is positioned corresponding to the open area 111.

Figure 3:
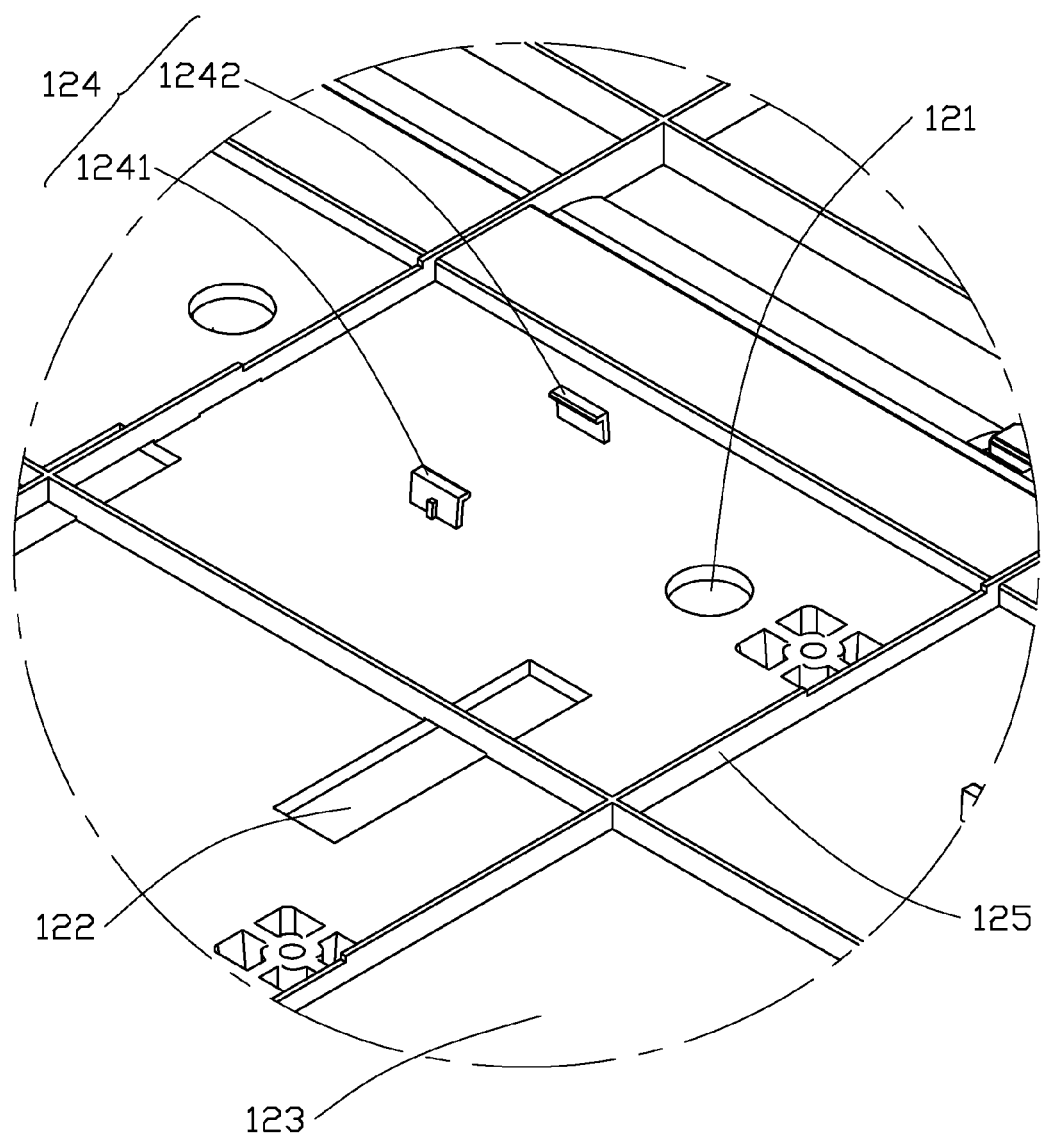
FIG. 3 is an enlarged view of a circled portion III of the FIG. 2.

FIG. 3 is an enlarged view of a circled portion III of the FIG. 2. Referring to FIG. 3, a number of first holes 121 and a number of second holes 122 are defined in the back frame 12. The back frame 12 includes an inner surface 123 adjacent to the front frame 11. A number of hooks 124 and a number of stiffeners 125 are formed on the inner surface 123. The stiffeners 125 improve the intensity of the back frame 12. Each of the hooks 124 includes hook members 1241 and 1242. The hook members 1241 and 1242 fix the heat dissipation assembly 40 on the back frame 12.

Figure 4:
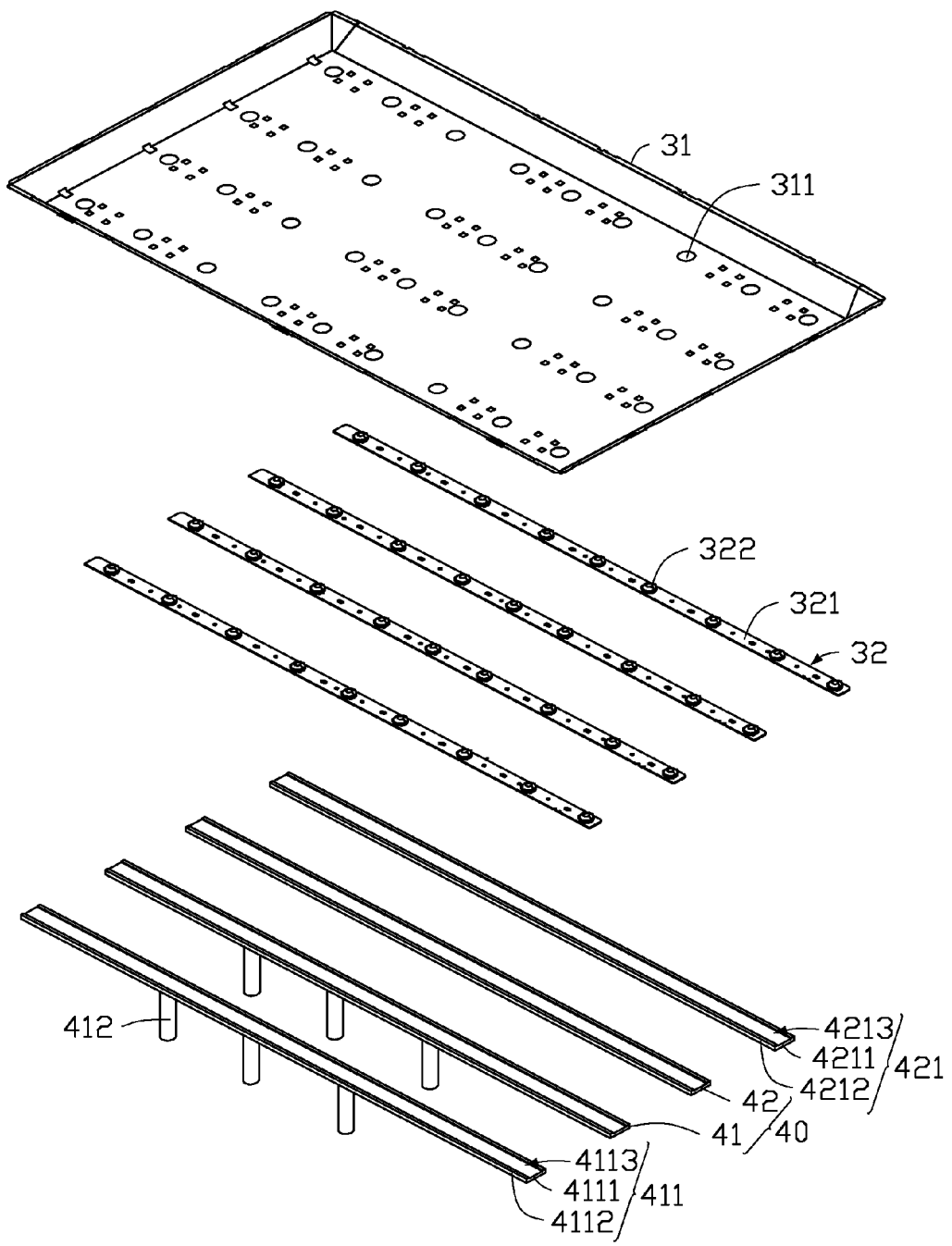
FIG. 4 is an exploded, isometric view of a backlight module and a heat dissipation assembly of the display device.

FIG. 4 is an exploded, isometric view of the backlight module 30 and the heat dissipation assembly 40 of the display device 100. Referring to FIG. 4, the backlight module 30 includes a reflector 31 and a number of light bars 32. A number of third holes 311 are defined in the reflector 31. The reflector 31 faces the display panel 20. The light bars 32 are formed on one side of the reflector 31 away from the display panel 20. The light bars 32 are parallel to each other. Each light bar 32 includes a substrate 321 and a number of light sources 322 formed on the substrate 321. The light sources 322 are formed on one side of the substrate 321 adjacent to the reflector 31. Each light source 322 is opposite to the third hole 311. The light sources 322 emit light to the display panel 20 through the third holes 311. In this embodiment, the light sources 322 are light emitting diodes (LEDS).

The heat dissipation assembly 40 is made of metal or alloy metal. The heat dissipation assembly 40 includes a number of first heat dissipation bars 41 and second heat dissipation bars 42 opposite to the light bars 32. Each of the first heat dissipation bars 41 includes a main body 411 and a number of heat dissipation columns 412 formed on the main body 411. Each main body 411 includes a board 4111 and a pair of sidewalls 4112. The sidewalls 4112 are substantially parallel to each other and extending vertical to the board 4111. The board 4111 and the pair of sidewalls 4112 of each main body 411 define a groove 4113. The groove 4113 accommodates the substrate 321 of the light bar 32. The board 4111 is cling to the substrate 321 to absorb the heat of the light source 322. The heat dissipation columns 412 are opposite to the first holes 121. In this embodiment, the heat dissipation columns 412 are hollow. Each of the second heat dissipation bars 42 includes a main body 421. The main body 421 includes a board 4211 and a pair of sidewalls 4212 substantially parallel to each other and extending vertical to the board 4211. The board 4211 and the pair of sidewalls 4212 of each main body 421 define a groove 4213.

Figure 5:
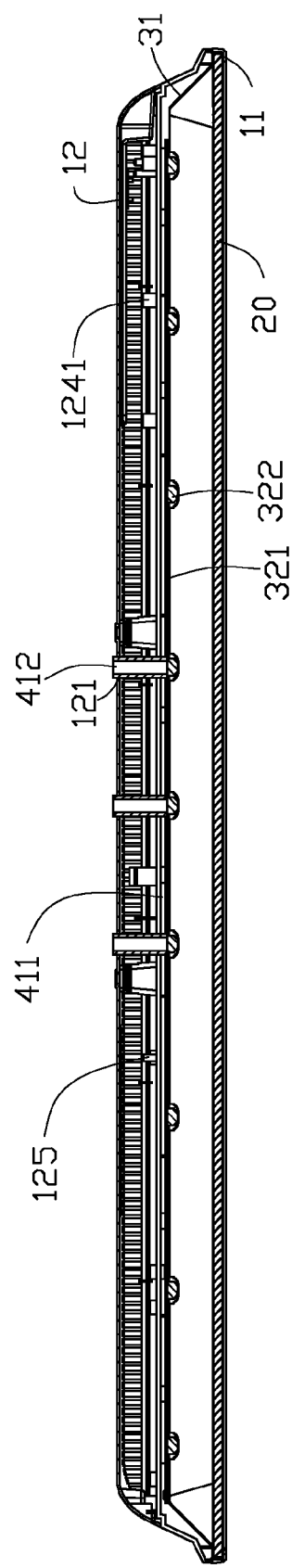
FIG. 5 is a cross-sectional view of the display device of FIG. 1, taken along line V-V.

FIG. 5 is a cross-sectional view of the display device of FIG. 1, taken along line V-V. Referring to FIG. 5, the display device 100 is assembled. The dissipation columns 412 are exposed external to the housing 10 through the first holes 121. The reflector 31 is fixed on the back frame 12. The light sources 322 are assembled through the third holes 311. The display panel 20 is fixed on the front frame 11. The front frame 11 is assembled to the back frame 12.

While the display device 100 is on, the light sources 322 emit light to the display panel 20 and generate heat. The heat dissipation assembly 40 is absorbs the heat generated by the light sources 322 and dissipates the heat external to the housing 10 through the second holes 122 and the heat dissipation columns 412. Then, the temperature inside the housing 10 keeps low, and the housing 10 will not easily being deformed. Moreover, the intensity of the back frame 12 is improved by the heat dissipation assembly 40 fixed on the back frame 12 via the hooks 124. Thus, the uniformity of the light emitted from the backlight module 30 is improved.

It is believed that the discussed embodiments and their advantages will be understood from the foregoing description, and it will be apparent that various changes may be made thereto without departing from the disclosure or sacrificing all of its material advantages. The embodiments discussed herein do not limit the following claims.

What is claimed is:

1. A display device comprising:
a housing comprising:
a first hole defined in the housing; and
a hook formed on the housing,
a backlight module received in the housing, the backlight module comprising a plurality of light bars, each of the light bars comprising a substrate and a plurality of light sources formed on the substrate;
a display panel received in the housing; and
a heat dissipation assembly received in the housing and configured to absorb heat generated by the backlight module and dissipate the heat outside the housing, wherein the heat dissipation assembly comprises:
a plurality of first heat dissipation bars and a plurality of second heat dissipation bars opposite to the light bars, each of the first heat dissipation bars comprises:
a main body fixed on the housing via the hook; and
a heat dissipation column formed on the main body and exposed through the first hole,
each of the second heat dissipation bars comprises a main body;
wherein the housing comprises:
a front frame defines an open area, the display panel is positioned corresponding to the open area; and
a back frame assembled to the front frame, the heat dissipation assembly is assembled between the backlight module and the back frame;
wherein the back frame comprises an inner surface adjacent to the front frame, the hook and a stiffener is formed on the inner surface, the heat dissipation assembly is fixed on the back frame via the hook; the backlight module further comprises a reflector face the display panel, the light bar is formed on one side of the reflector away from the display panel, the light source is formed on one side of the substrate adjacent to the reflector; a third hole is defined in the reflector, the light source is opposite to the third hole, the light source emits light to the display panel through the third hole.

2. The display device of claim 1, wherein the main body comprises:
a board;
a pair of sidewalls substantially parallel to each other and extending vertically from the board; and
a groove defined by the board and the pair of sidewalls, the groove accommodates the substrate of the light bar.

3. The display device of claim 2, wherein the substrate is cling to the board.

4. The display device of claim 1, wherein the reflector is fixed on the back frame, the display panel is fixed on the front frame.

5. The display device of claim 1, wherein the light source is assembled through the third hole.

6. The display device of claim 1, wherein the light source is a light emitting diode light.

7. The display device of claim 1, wherein the heat dissipation assembly is made of metal.

8. A display device comprising:
a housing comprising:
a first hole defined in the housing; and
a hook formed on the housing,
a backlight module received in the housing, the backlight module comprising a light bars, the light bar comprising a substrate and a plurality of light sources formed on the substrate; and
a heat dissipation assembly received in the housing and configured to absorb heat generated by the backlight module and dissipate the heat external to the housing, the heat dissipation assembly comprising:
a main body fixed on the housing via the hook; and
a plurality of heat dissipation columns formed on the main body and exposed through the first hole;
wherein the main body comprises:
a board, the plurality of heat dissipation columns being formed on a surface of the board;
a pair of sidewalls extending vertically from a surface of the board away from the heat dissipation columns; and
a groove defined by the board and the pair of sidewalls, the groove accommodates the substrate of the light bar.

9. The display device of claim 8, wherein the substrate is cling to the board.

* * * * *